(12) United States Patent
Osman

(10) Patent No.: US 8,218,903 B2
(45) Date of Patent: Jul. 10, 2012

(54) 3D OBJECT SCANNING USING VIDEO CAMERA AND TV MONITOR

(75) Inventor: Steven Osman, San Francisco, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 1023 days.

(21) Appl. No.: 11/840,813

(22) Filed: Aug. 17, 2007

(65) Prior Publication Data

US 2008/0266294 A1 Oct. 30, 2008

Related U.S. Application Data (60) Provisional application No. 60/913,793, filed on Apr. 24, 2007.

(51) Int. Cl.
- *G06K 9/36* (2006.01)
- *G06K 9/00* (2006.01)
- *G06T 15/50* (2011.01)
- *G06T 15/60* (2006.01)
- *G06T 15/10* (2011.01)
- *G06T 15/20* (2011.01)
- *G06K 9/42* (2006.01)
- *G06K 9/44* (2006.01)

(52) U.S. Cl. ........ 382/285; 382/100; 382/154; 382/256; 345/426; 345/427

(58) Field of Classification Search .................. 382/285, 382/154; 345/426, 427
See application file for complete search history.

(56) References Cited

U.S. PATENT DOCUMENTS

| | | | |
|---|---|---|---|
| 6,157,744 A | 12/2000 | Nagasaka et al. | |
| 6,369,879 B1 * | 4/2002 | Pedersen | 356/3.01 |
| 6,819,319 B1 | 11/2004 | Fenney | |
| 7,034,821 B2 | 4/2006 | Baumberg | |
| 7,317,812 B1 * | 1/2008 | Krahnstoever et al. | 382/103 |
| 7,620,234 B2 | 11/2009 | Taylor | |

(Continued)

FOREIGN PATENT DOCUMENTS

| JP | 11331875 A | 11/1999 |
|---|---|---|
| JP | 2001147110 A | 5/2001 |

OTHER PUBLICATIONS

Proesmans et al., "Reading between the lines—a method for extracting dynamic 3D with texture", IEEE Sixth International Conference on Computer Vision, 1998, pp. 1081-1086.*

(Continued)

*Primary Examiner* — Brian Q Le
*Assistant Examiner* — Jose M Torres
(74) *Attorney, Agent, or Firm* — Kilpatrick Townsend & Stockton LLP

(57) ABSTRACT

A system creates three-dimensional computer models of physical objects by displaying illumination patterns on a display device to incidentally illuminate a physical object. A video camera acquires images of the object illuminated by the patterns. The patterns can include motion and multiple colors for acquiring images with large variations in surface shading of the object. Shading values from acquired images of the object are analyzed to determine the orientations of points on the object's surface. The system evaluates the quality of acquired images and selects patterns tailored to specific attributes of objects. The points' orientations are determined by comparing the points' shading values with an illumination model or shading values acquired from a calibration shading object. A model surface is fitted to the points' orientations. Applications may utilize the model for any purpose, including creating and exchanging customized virtual objects, enhanced object tracking, and videoconferencing applications.

31 Claims, 9 Drawing Sheets

U.S. PATENT DOCUMENTS

| | | | |
|---|---|---|---|
| 7,657,083 B2* | 2/2010 | Parr et al. | 382/155 |
| 2003/0128207 A1 | 7/2003 | Sawada | |
| 2006/0119848 A1* | 6/2006 | Wilson et al. | 356/399 |
| 2007/0035541 A1 | 2/2007 | Isner et al. | |

OTHER PUBLICATIONS

International Search Report mailed on Aug. 18, 2008, for PCT Application No. PCT/US08161288 filed on Apr. 23, 2008, 2 pages.

* cited by examiner

3D OBJECT SCANNING USING VIDEO CAMERA AND TV MONITOR

CROSS-REFERENCE TO RELATED APPLICATIONS

This application claims priority to U.S. Provisional Patent Application No. 60/913,793, filed Apr. 24, 2007, entitled "3D Object Scanning Using Video Camera and TV Monitor," which is hereby incorporated herein by reference.

BACKGROUND OF THE INVENTION

This invention relates to the methods and devices for creating three-dimensional models of objects from two-dimensional images of the object. Many computer graphic images are created by mathematically modeling the interaction of light with three dimensional models in a scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. Interactive software applications, such as games and other educational or entertainment applications, often use rendering software and hardware to generate computer graphics images at interactive frame rates in response to user inputs.

Typically, the three-dimensional models in interactive software applications are generated by computer graphics artists using complex three-dimensional drafting or modeling applications. Additionally, sculptors may create physical models of objects, which are then converted into a three-dimensional computer graphics model using specialized three-dimensional scanners. All of these techniques require specialized hardware, software, and highly trained artists. Because of this complexity, the three-dimensional objects included in interactive software applications are typically limited to those provided by the software provider or by users with access to three-dimensional modeling applications.

It is therefore desirable for a system and method to allow users to create a three-dimensional graphics model of a physical object for interactive software applications. It is further desirable for three-dimensional computer graphics models to be created without requiring the use of modeling or drafting applications. It is still further desirable for the system to be implemented using low-cost and widely available consumer electronics.

BRIEF SUMMARY OF THE INVENTION

An embodiment of the invention includes a system for creating three-dimensional computer graphics models of physical objects. Illumination patterns displayed on a display device incidentally illuminate a physical object. A video camera acquires one or more images of the physical object illuminated by the illumination patterns. Illumination patterns can include motion and multiple colors, enabling the video camera to acquire images with large variations in surface shading of the physical object. Shading values from acquired images of the physical object are analyzed to determine the surface orientation of points on the physical object. An embodiment of the invention evaluates the quality and suitability of images acquired and may use the results of this evaluation to select further appropriate illumination patterns to be displayed. Illumination patterns can be tailored to specific optical, geometric, and physical attributes of physical objects, increasing the versatility of the system with different types of objects.

In an embodiment, an illumination model determines one or more candidate surface orientations from each shading value in the image of the physical object produced by an illumination pattern. Alternatively, shading values for each illumination pattern can be crossed referenced with similar shading values on a calibration object having a known geometry and illuminated by the same illuminate pattern. The sets of candidate surface orientations for points on a model of the physical object are reduced with further images of the physical object and additional illumination patterns, until a model surface can be fitted to the surface orientations of the model points.

Embodiments of the invention can provide the model of the physical object to an application for any purpose, including enabling users to create and exchange customized virtual objects, enhanced tracking of physical objects, and videoconferencing applications.

BRIEF DESCRIPTION OF THE DRAWINGS

The invention will be described with reference to the drawings, in which.

DETAILED DESCRIPTION OF THE INVENTION

Figure 1:
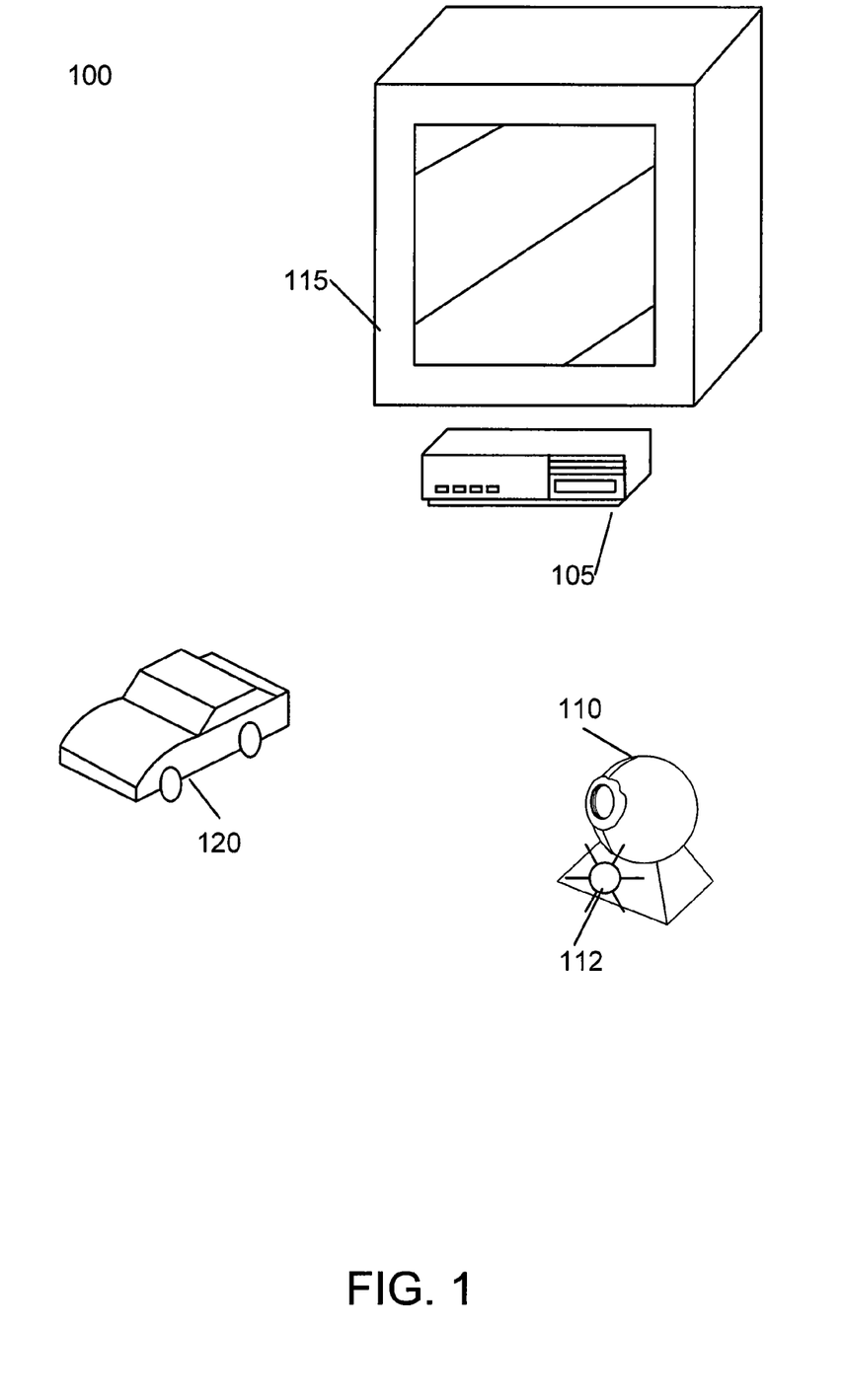
FIG. 1 illustrates a system for creating a three-dimensional computer graphics model of a physical object according to an embodiment of the invention.

FIG. 1 illustrates a system 100 for creating a three-dimensional computer graphics model of a physical object according to an embodiment of the invention. System 100 includes a computer device 105, which may be any type of computing device, including a personal computer, set-top entertainment box, home or portable video game console, personal digital assistant, or video conferencing device. Device 105 is connected with a video camera 110 via a wired or wireless interface. In an embodiment, camera 110 is built into device 105. In an alternate embodiment, camera 110 is separate from device 105. Camera 110 is configured to capture still or moving images and communicate these images with device 105. In an embodiment, camera 110 further includes one or more built in lights 112, which can be selectively activated to provide visible or infrared illumination. Similarly, camera 110 may be capable of capturing images comprised of visible and/or infrared light. In a typical embodiment, camera 110 may be similar to low-cost web cameras commonly used for video conferencing over the Internet or other wide-area networks.

In addition to camera 110, system 100 also includes a display device 115. Display device 115 may be a television or computer monitor using any type of display technology, including cathode ray tube, LED, LCD, OLED, and/or plasma display technology. The device 105 is connected with the display 115, so that computer graphics images and patterns generated by the device 105 are displayed by display device 115.

An embodiment of system 100 arranges display device 115 so that the images produced by the display device 115 illuminate an object 120 to be scanned. Object 120 can be any physical object selected by a user. Although display device 115 is not a projector intended to project an image or pattern on a screen or any other object, display device 115 is typically bright enough to incidentally illuminate an object while displaying an image.

The camera 110 will capture images of the object 120 as it is illuminated by one or more patterns produced by display device 115. As discussed in detail below, many different illumination patterns can be output by display device 115 to create an accurate model of the object 120. Additionally, a user can rotate or move the object 120 into different positions and orientations, so that a complete model of the object 120 from all angles can be created. By analyzing these images, device 105 can construct a three-dimensional computer graphics model of the object 120. Interactive software applications executed by device 105 or by other devices can then incorporate the three-dimensional computer graphics model into its operations.

Figure 2A:
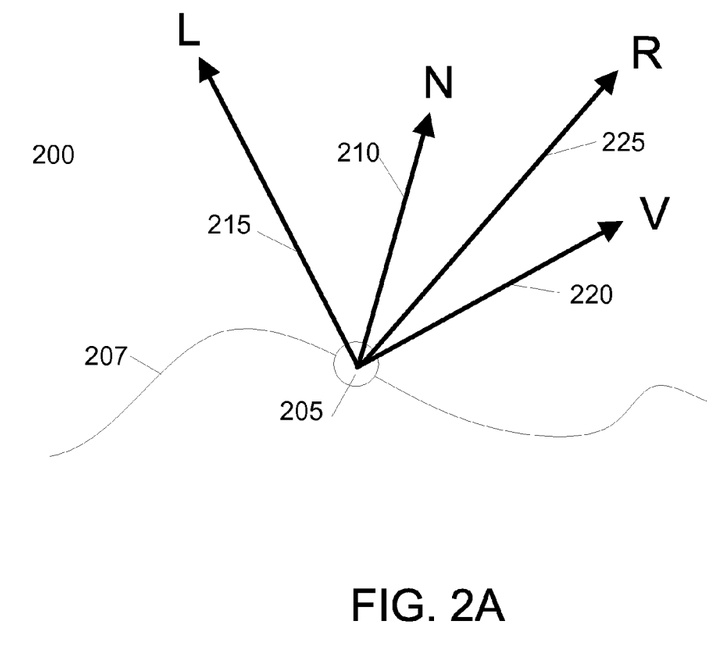
FIGS. 2A-2B illustrate a technique for estimating the surface orientations of points on a physical object suitable for use with an embodiment of the invention.
Figure 2B:
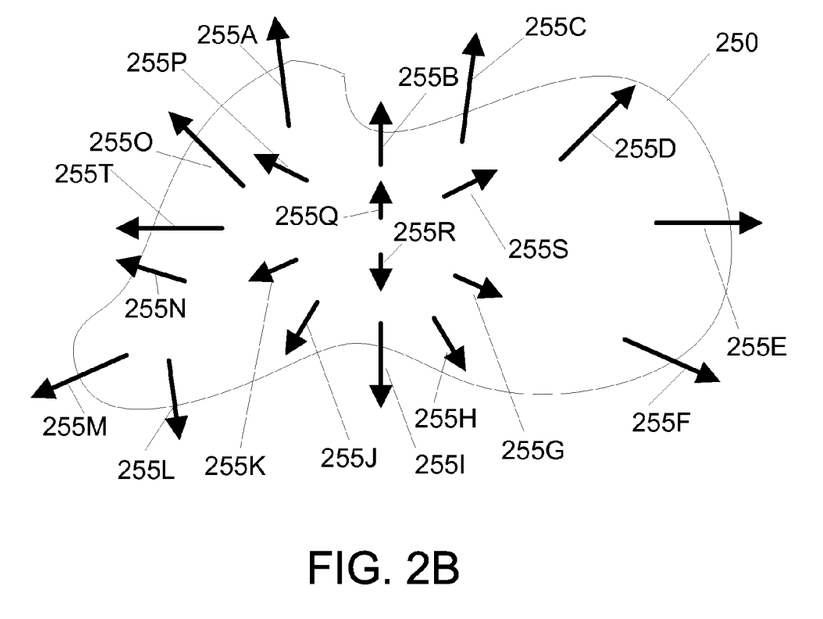

There are a number of techniques known in the art for determining the structure or shape of an object from one or more images. One general technique determines the orientation of a point on the surface of an object from its shading in response to illumination from one or more light sources. FIGS. 2A-2B illustrate a technique for estimating the surface orientations of points on a physical object suitable for use with an embodiment of the invention.

FIG. 2A illustrates a general illumination model 200 that specifies the shading of a point on an object based on the orientation of the object's surface at that point. In illumination model 200, the shading of point 205 on a surface 207 is based on the angle between the normal vector 210 of the surface 207 at point 205 and a light vector 215, which extends from point 205 to a light source. For example, the Phong illumination model assigns a diffuse shading value to a point based upon the dot product or angle between vectors 210 and 215. Furthermore, the illumination model 200 may base a portion of the shading of a point 205 on the angle between a reflection 225 of the light vector 215 and a view vector 220, which extends from point 205 to the camera or viewer. For example, the Phong illumination model assigns a specular shading value based on an exponential value of the dot product or angle between vectors 220 and 225.

Because the shading of a point on a surface is based on the surface orientation, it follows that the surface orientation can be determined from a shading value. Typically, a given shading value from a single light source may correspond with a number of possible surface orientations. However, by analyzing images from multiple light sources at different positions, the number of candidate orientations for a surface point can typically be reduced to single orientation. Additional processing on the images and the resulting extracted surface orientation data, such as noise reduction and other filtering, background extraction, silhouette extraction, and mesh generation, combination, and simplification, can then be used to construct a three-dimensional computer model of an object.

FIG. 2B illustrates an image of an object 250. By illuminating the object from different light sources and analyzing the shading of the surface at a number of points, the orientation of the object surface can be determined. A vector field including vectors 255a-255t defines the normal vectors of the surface of the object 250. An embodiment of the invention fits a surface to the vector field to define a computer graphics model of the object 250. The number of vectors in vector field 255 is shown for purposes of illustration, and embodiments of the invention can utilize vector fields of any arbitrary number of vectors to define the surface of a model of an object, limited only by the resolution of the camera and the requirements of the application.

Previous implementations of this technique have required dedicated light sources at specific positions relative to the object and the camera. Often, these light sources must be adjusted to account for the unique topological, physical, and optical characteristics of specific objects to create an accurate and complete object.

In contrast, embodiments of the invention utilize the images or patterns produced by a display device as a light source to illuminate the object. Because the display device can produce complex and varying patterns typically not possible with conventional light sources, embodiments of the invention can be used to create models of many different types objects without requiring complex manual adjustments of light sources by users.

Figure 3:
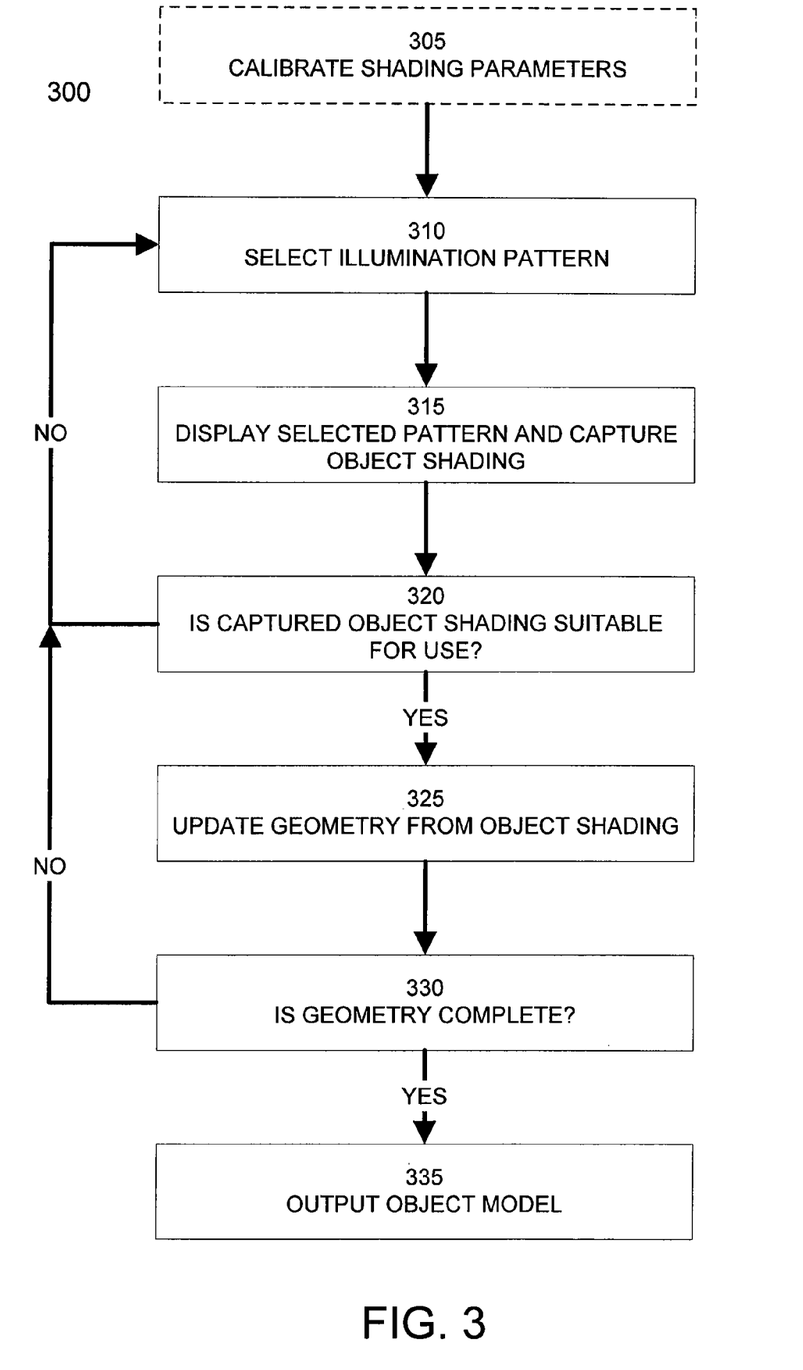
FIG. 3 illustrates a method of creating a three-dimensional computer graphics model according to an embodiment of the invention.

FIG. 3 illustrates a method 300 of creating a three-dimensional computer graphics model according to an embodiment of the invention. Optional step 305 calibrates shading parameters. In an embodiment, step 305 displays one or more illumination patterns on the display device and measures the shading values on the surface of a known object to match shading values captured by the camera with known surface orientation values.

Step 310 selects an illumination pattern for display. In an embodiment, the system includes a number of predetermined or algorithmically generated illumination patterns available for selection. In a further embodiment, the illumination patterns may include animation, so as to enable the camera to capture the change in surface shading when a light source moves relative to the object. As discussed in detail below, each illumination pattern may be suitable for use with any type of object or may be tailored to capture details on objects with specific topological, physical, and/or optical characteristics. On initial iterations of step 310, general-purpose illumination patterns are typically selected. The resulting images captured with these illumination patterns, as well as the geometry of the model, can be used to select more specialized illumination patterns on subsequent iterations of step 310.

Step 315 displays the selected illumination pattern and uses the camera to capture one or more images of the surface shading of the object. In an embodiment, step 315 alternates the display of the illumination pattern with a blank pattern. The difference between the images associated with these two patterns will eliminate or reduce the contribution of ambient or other light sources to the surface shading of the object.

Step 320 determines if the object surface shading in one or more images acquired in step 315 is suitable for use in determining the geometry of the model. For example, if an image is all or mostly blank, it may be unsuitable for extracting the surface orientation of the object. A blank image can occur if the object does not reflect enough light from an illumination pattern, such as if a blue illumination pattern is projected onto a green object. Additional criteria for suitability may include whether there is substantial image noise, whether the image is in focus and properly exposed, whether the silhouette of the object in an image is similar to silhouettes derived from prior images, whether the portion of the image associated with the object is contiguous or if there are many blank areas or gaps in this portion of the image, and whether the shading is consistent with the shading in other images.

If the object shading in the images captured in step 315 is not suitable for use in creating a model of the object, method 300 proceeds from step 320 back to step 310 to select a different illumination pattern. In an embodiment, step 310 uses its knowledge about which illumination patterns produce suitable or unsuitable images of an object to select an appropriate illumination pattern to capture further images of an object. For example, if a blue illumination pattern results in a blank image, indicating that the object reflects little or no blue light, an embodiment of step 310 may limit its selection of subsequent illumination patterns to those that include red or green light.

Conversely, if the image or images captured in step 315 include object shading of sufficient quality, method 300 proceeds from step 320 to step 325. Step 325 updates the geometry using the object shading in the images captured in step 315. In an embodiment, a silhouette of the object is determined and its interior is populated with a number of mesh points. The shading values of one or more image points overlapping or near each mesh point are used to determine one or more candidate surface orientations for each mesh point. One or more illumination models may be utilized to determine candidate surface orientations from shading values. As additional images from different illumination patterns are processed, the number of candidate surface orientation values for each mesh point are reduced.

In an embodiment, the number of candidate surface orientation values for each mesh point are reduced by initializing each mesh point to include all possible surface orientations. As a set of candidate surface orientations is determined from an illumination pattern for a mesh point, the intersection of this set of surface orientations and the mesh point's previous candidate surface orientations is determined. This intersecting subset of candidate surface orientations is then stored as the mesh point's remaining candidate surface orientations. Further candidate surface orientations from additional illumination patterns are intersected with the mesh point's remaining surface orientations on subsequent iterations of method 300. Approximation and estimation techniques, such as averaging and least squares approximations, may be used to account for measurement error from the camera.

Step 330 determines if the object model geometry is completely specified. In an embodiment, step 330 determines that the object model geometry is sufficiently complete if all or a large portion of the mesh points have a single remaining candidate surface orientation. In a further embodiment, the surface orientations of any other mesh points may be determined by interpolation. Once the surface orientations of the mesh points has been determined, a model surface fitting the surface orientations is defined. The model surface can be defined using triangles, polygons, higher-order curved surfaces such as NURBS, subdivision surfaces, particle systems, or any other mathematical representation of object geometry known in the art.

If the geometry is completely specified, method 300 proceeds to step 335 to output the object model. Otherwise, method 300 proceeds back to step 310 to select an additional illumination pattern. In an embodiment, the illumination pattern selected by subsequent iterations of step 310 is determined at least in part by the number and types of candidate surface orientations remaining for the mesh points.

For example, if a portion of an object's surface may be convex or concave, based on the candidate surface orientations of its surface points, then an embodiment of step 310 may select an illumination pattern designed to distinguish between convex and concave geometry. For example, if a convex portion of an object is illuminated from below, the bottom of this portion will be brighter than the top of this portion. Conversely, if a concave portion of an object is illuminated from below, then the top of this portion will be brighter than the bottom of this portion.

In a further embodiment, the user may be instructed to rotate the object into a new position and steps 310-330 repeated to determine the geometry of other portions of the object previously not visible to the camera. This geometry may be combined with object geometry identified from previous orientations of the object to create a complete and closed version of the object from all angles. Alternatively, the geometry of an object determined from one or more orientations may be combined with predefined object geometry to create a closed object. For example, method 300 may be used to determine the geometry of a user's face. This geometry can be combined with a predefined head model. In a further embodiment, a texture map or other surface shading information is also created from the images of the object. In an embodiment, this is done by selecting one of the images or a combination of multiple images, eliminating the background, and then projecting the image onto the model surface to determine texture coordinates.

Embodiments of the invention may use a wide variety of different types of illumination patterns to determine the orientation of points on the surface of an object. Typically, an illumination pattern is designed to project light from one or more directions on to the surface of the object. FIGS. 4A-4D illustrate example illumination patterns suitable for use with an embodiment of the invention.

Figure 4A:
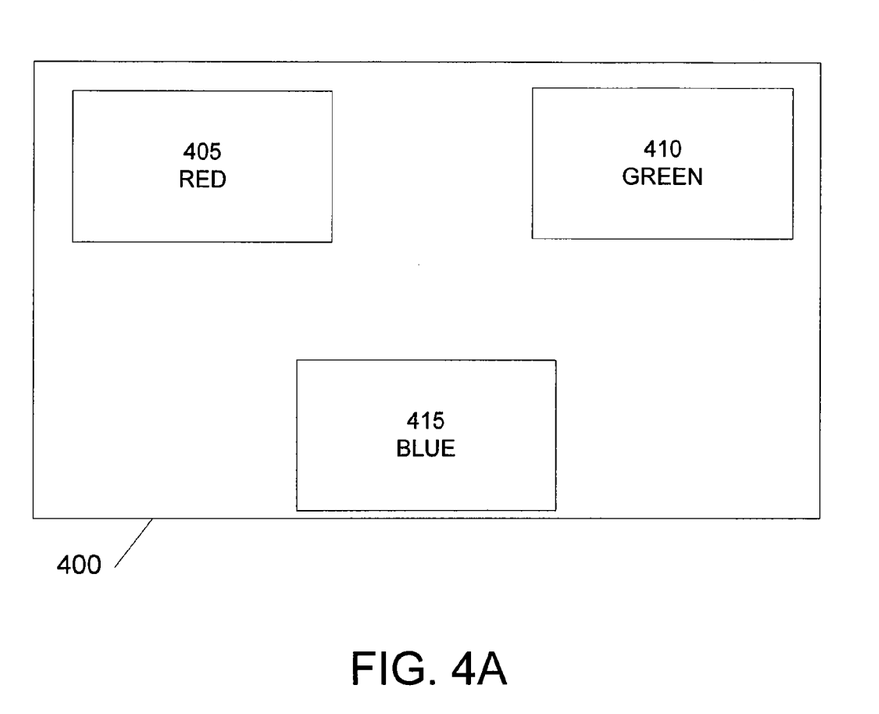
FIGS. 4A-4D illustrate example display patterns suitable for use with an embodiment of the invention.

FIG. 4A illustrates an example illumination pattern 400. Illumination pattern 400 includes a region of red light 405 in the top left corner, a region of green light 410 in the top right corner, and a region of blue light 415 in the bottom center of the pattern. Illumination pattern 400 is adapted to be used with a color video camera. As typical color video cameras can capture red, green, and blue light in an image simultaneously, illumination pattern 400 allows the camera to capture the shading of the object from three different light sources at different positions in a single image. In this example, all of the red light in an image (i.e. the red color component of each pixel) will originate from region 405, all of the green light in an image (i.e. the green color component of each pixel) will originate from region 410, and all of the blue light in an image (i.e. the blue color component of each pixel) will originate from region 415.

Figure 4B:
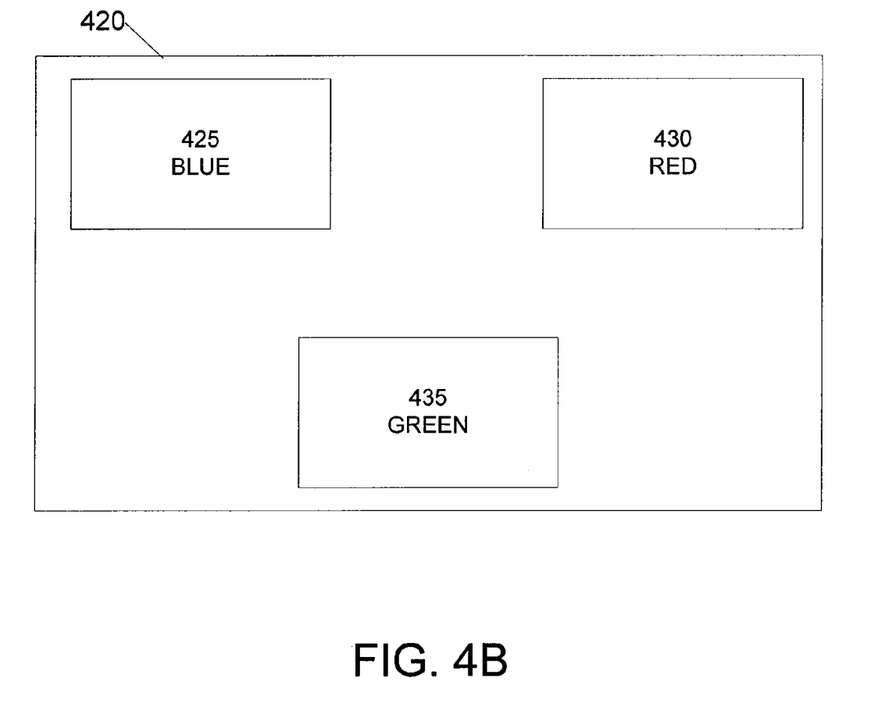

The example illumination pattern 400 assumes that the object surface reflects light of all colors approximately equally. Scaling or normalization of shading values of each color component may be used to compensate for an object surface reflecting different colors of light in different amount. In a further example, FIG. 4B illustrates a second illumination pattern 420. Illumination pattern 420 is similar to pattern 400, except that the positions of the color regions have been swapped. In illumination pattern 420, the red region 430 is located in the upper right corner, the green region 435 is located in the bottom center, and the blue region 425 is located in the upper left corner. By comparing the shading of the object from regions 405 and 425, 410 and 430, and 415 and 435, respectively, an embodiment of the invention can compensate for the different color reflectivity characteristics of an object. For example, the ratio of shading values from region 405 and region 425 is proportional to the ratio of the object's surface reflectivity difference between red and blue light.

Figure 4C:
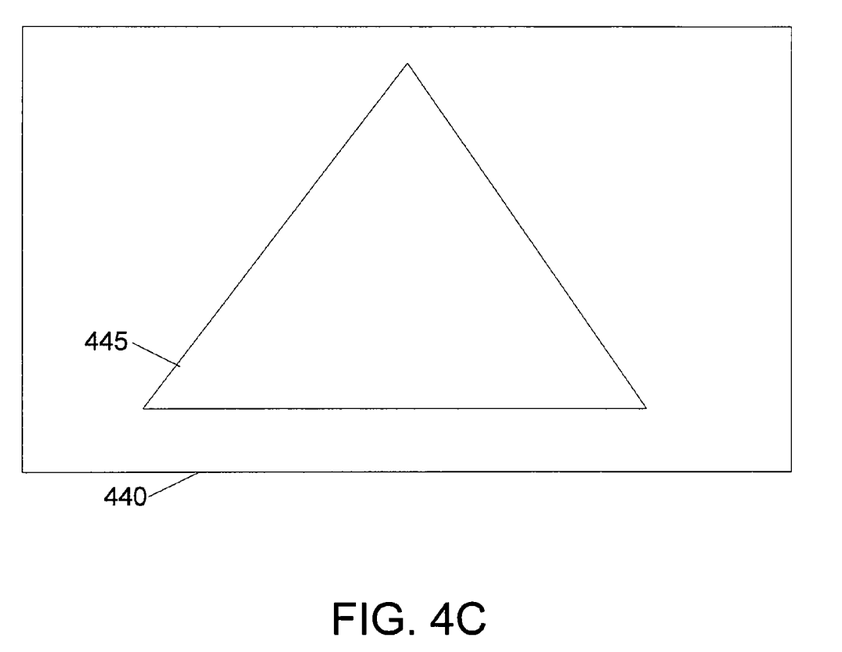
Figure 4D:
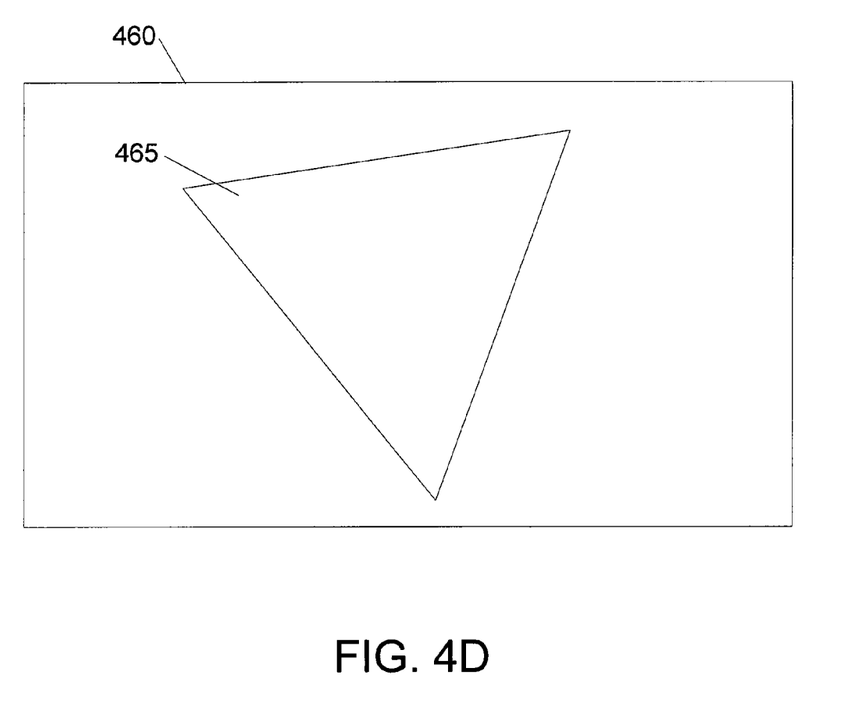

In addition to using color, illumination patterns can use motion, such as translation and rotation, to observe the change in surface shading on an object in response to a moving light source. FIG. 4C illustrates an example illumination pattern 440 including a lit triangle 445 in a first position and orientation. FIG. 4D illustrates an example illumination pattern 460 including a similar triangle 465 in a different position and orientation. By capturing images of the object shading as the triangle moves between different positions and orientations, it is possible to discern the orientation of points on the surface of the object.

As discussed above, a shading or illumination model of the surface light reflection may be used to determine candidate surface orientations for a point based on the point's shading value from a light source. In a further embodiment, a calibration object with known surface orientations may be used to improve the accuracy of the surface orientation analysis. In an embodiment, the system illuminates a calibration object with one or more illumination patterns. The surface shading of the calibration object at a number of surface points is captured by a camera. Because the calibration object has a known geometry, the surface orientation of each surface point is also known. Thus, for each illumination pattern, the system stores a data structure associating each shading value with one or more candidate surface orientations. When analyzing an unknown object with the same illumination pattern, the shading value of surface point can be used to retrieve a set of candidate surface orientations from the data structure.

Figure 5A:
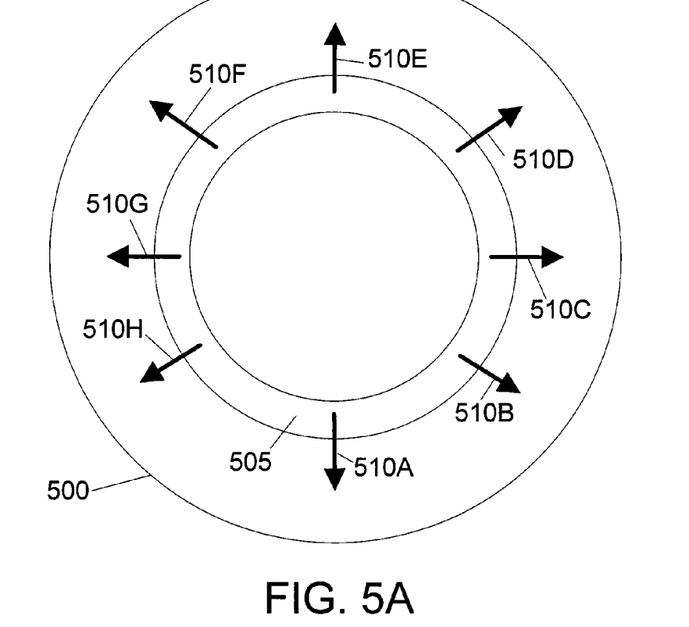
FIGS. 5A-5C illustrate example calibration objects suitable for use with an embodiment of the invention.
Figure 5B:
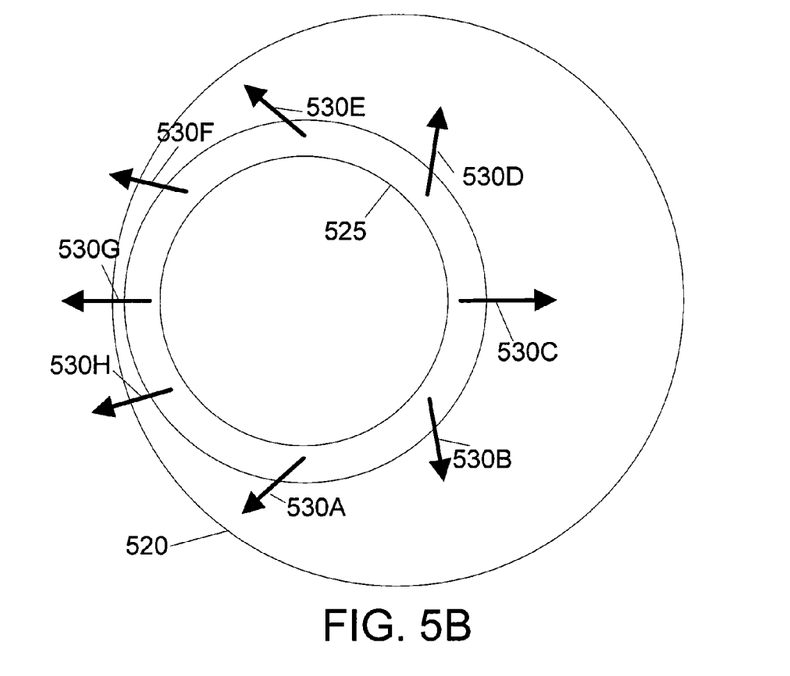
Figure 5C:
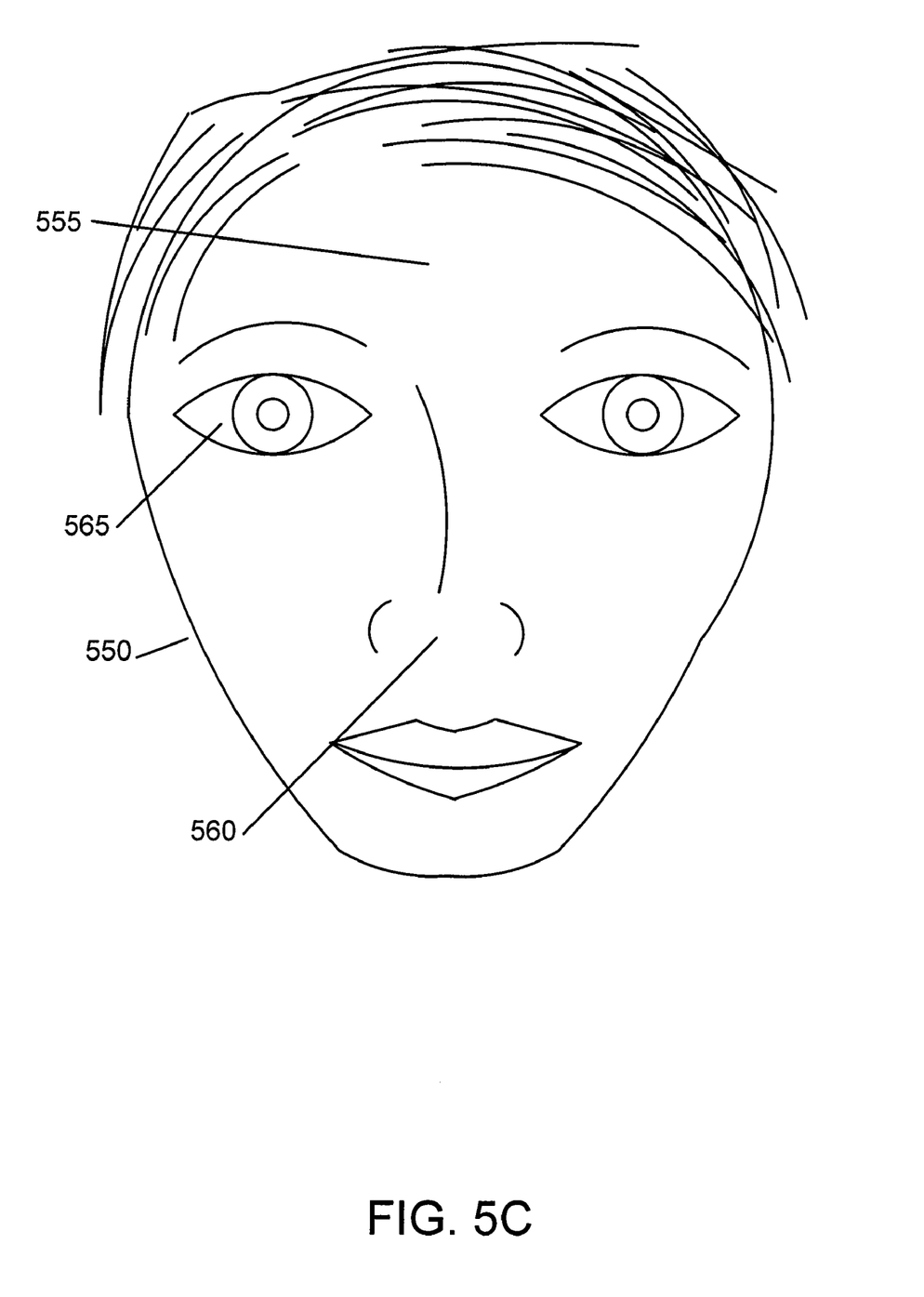

FIGS. 5A-5C illustrate example calibration objects suitable for use with an embodiment of the invention. FIG. 5A illustrates an example calibration object illuminated by a first illumination pattern 500. In this example, the calibration object is a sphere. If the first illumination pattern illuminates the calibration object head on, a region 505 will have approximately the same shading value. Because the geometry of the calibration object is known, region 505 will be associated with a set of candidate surface orientations 510 including surface normal vectors 510*a*-510*h*. When an unknown object is analyzed using the same illumination pattern, any surface point having a shading value similar to that of region 505 will be assigned some or all of the set of candidate surface orientations 510. For the first illumination pattern, similar analysis can be performed for other regions of the surface of the calibration object having other shading values.

FIG. 5B illustrates the same example calibration object illuminated by a second illumination pattern 520. In this example, the second illumination pattern 520 illuminates the calibration object from the side. Region 525 of the surface of the calibration object will have approximately the same shading value. Because the geometry of the calibration object is known, region 525 will be associated with a set of candidate surface orientations 530 including surface normal vectors 530*a*-530*h*. When an unknown object is analyzed using the same illumination pattern, any surface point having a shading value similar to that of region 525 will be assigned some or all of the set of candidate surface orientations 530. For the second illumination pattern, similar analyses can be performed for other regions of the surface of the calibration object having other shading values.

As an alternative to a special calibration object, an embodiment of the invention may use facial features of a user as a calibration object. FIG. 5C illustrates an example user's face 550 illuminated by a illumination pattern. Certain user facial features may have known geometry. For example, the tip of the nose 560, the forehead 555, and the eye 565 are both roughly spherical. An embodiment of the invention may use the shading from illumination patterns on either or both of these facial features to associate shading values with candidate surface orientations.

Object models created using embodiments of the invention can be incorporated into interactive software applications in a number of ways. For example, models of a user's favorite objects can be used to decorate a user's virtual space or to present as electronic gifts to other users. Users can add their face on a character in a game. Object models can be rendered and displayed to users using any rendering technique known in the art, including polygon rasterization and ray tracing rendering techniques.

In a further example, an embodiment of the invention can correct for camera position in video conference applications. Typically, users in video conferences look at the video screen, rather than at the camera. As the camera is typically located to the side or above the screen in video conference applications, it is hard for users in video conferences to make eye contact. An embodiment of the invention creates a model of the user's head, using the techniques described above. This model is used to determine the position of the camera relative to the user's head. Based on this information, an application of an embodiment of the invention can map the captured video as a texture on the model, and then render the model of user's head overlaid with a captured video texture from head on. This simulates the effect of the user looking directly at camera.

In still a further embodiment, the system uses illumination patterns projected from the display device to create an initial high resolution model of an object. The system can then use visible illumination patterns from a portion of the display device or visible or infrared illumination patterns projected from a light source associated with the camera or with another to capture a low resolution model of the object. The low resolution model can be used by an application to track changes in the position and orientation of an object or to capture continuous changes in the shape of the object, such as changing facial expressions in a user's face. These changes can be used to modify the position or shape of the high resolution version of the model of the object. This information from the low resolution model can be used as an input to an application, such as having a character's facial expressions in a game mirror the user's facial expressions or having a virtual object in an application follow the user's movements of a physical object.

Figure 6:
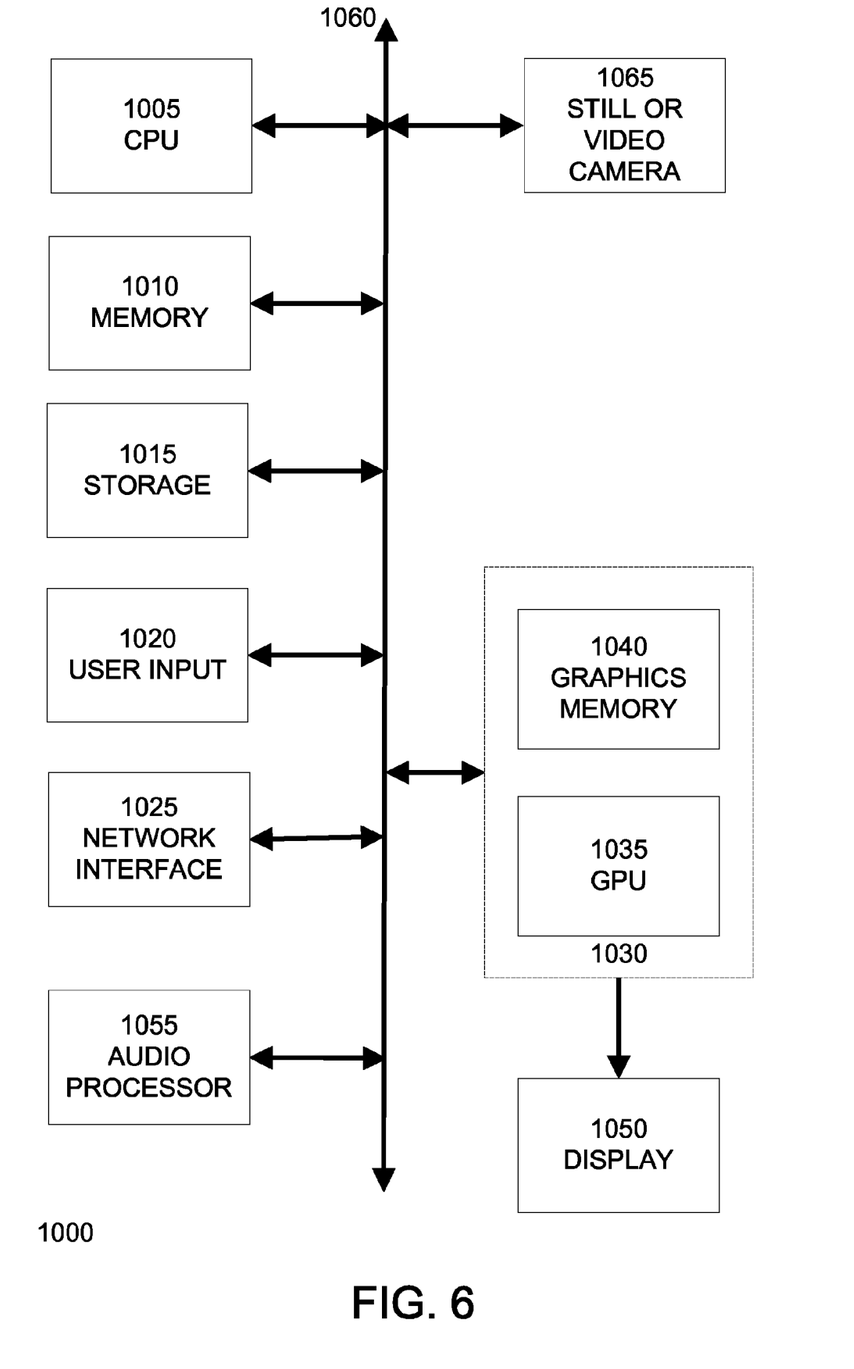
FIG. 6 illustrates an example computer system suitable for use in implementing an embodiment of the invention.

FIG. 6 illustrates an example computer system 1000 suitable for use in implementing an embodiment of the invention. FIG. 6 is a block diagram of a computer system 1000, such as a personal computer, video game console, personal digital assistant, or other digital device, suitable for practicing an embodiment of the invention. Computer system 1000 includes a central processing unit (CPU) 1005 for running software applications, implementing logic functions, and optionally an operating system. CPU 1005 may be comprised of one or more processing cores. Memory 1010 stores applications and data for use by the CPU 1005. Storage 1015 provides non-volatile storage for applications and data and may include fixed disk drives, removable disk drives, flash memory devices, and CD-ROM, DVD-ROM, Blu-ray, HD-DVD, or other optical storage devices. User input devices 1020 communicate user inputs from one or more users to the computer system 1000, examples of which may include keyboards, mice, joysticks, touch pads, touch screens, still or video cameras, and/or microphones. Network interface 1025 allows computer system 1000 to communicate with other computer systems via an electronic communications network, and may include wired or wireless communication over local area networks and wide area networks such as the Internet. An audio processor 1055 is adapted to generate analog or digital audio output from instructions and/or data provided by the CPU 1005, memory 1010, and/or storage 1015. The components of computer system 1000, including CPU 1005, memory 1010, data storage 1015, user input devices 1020, network interface 1025, and audio processor 1055 are connected via one or more data buses 1060. In a further embodiment, a still or video camera 1065 is connected with the data buses 1060. The camera 1065 may be connected via an external interface, such as USB or Firewire interfaces, a wireless interface, or an internal interface with data buses 1060.

A graphics subsystem 1030 is further connected with data bus 1060 and the components of the computer system 1000. The graphics subsystem 1030 includes a graphics processing unit (GPU) 1035 and graphics memory 1040. Graphics memory 1040 includes a display memory (e.g., a frame buffer) used for storing pixel data for each pixel of an output image. Graphics memory 1040 can be integrated in the same device as GPU 1035, connected as a separate device with GPU 1035, and/or implemented within memory 1010. Pixel data can be provided to graphics memory 1040 directly from the CPU 1005. Alternatively, CPU 1005 provides the GPU 1035 with data and/or instructions defining the desired output images, from which the GPU 1035 generates the pixel data of one or more output images. The data and/or instructions defining the desired output images can be stored in memory 1010 and/or graphics memory 1040. In an embodiment, the GPU 1035 includes 3D rendering capabilities for generating pixel data for output images from instructions and data defining the geometry, lighting, shading, texturing, motion, and/or camera parameters for a scene. The GPU 1035 can further include one or more programmable execution units capable of executing shader programs.

The graphics subsystem 1030 periodically outputs pixel data for an image from graphics memory 1040 to be displayed on display device 1050. Display device 1050 is any device capable of displaying visual information in response to a signal from the computer system 1000, including CRT, LCD, plasma, and OLED displays. Computer system 1000 can provide the display device 1050 with an analog or digital signal.

Figure 7:
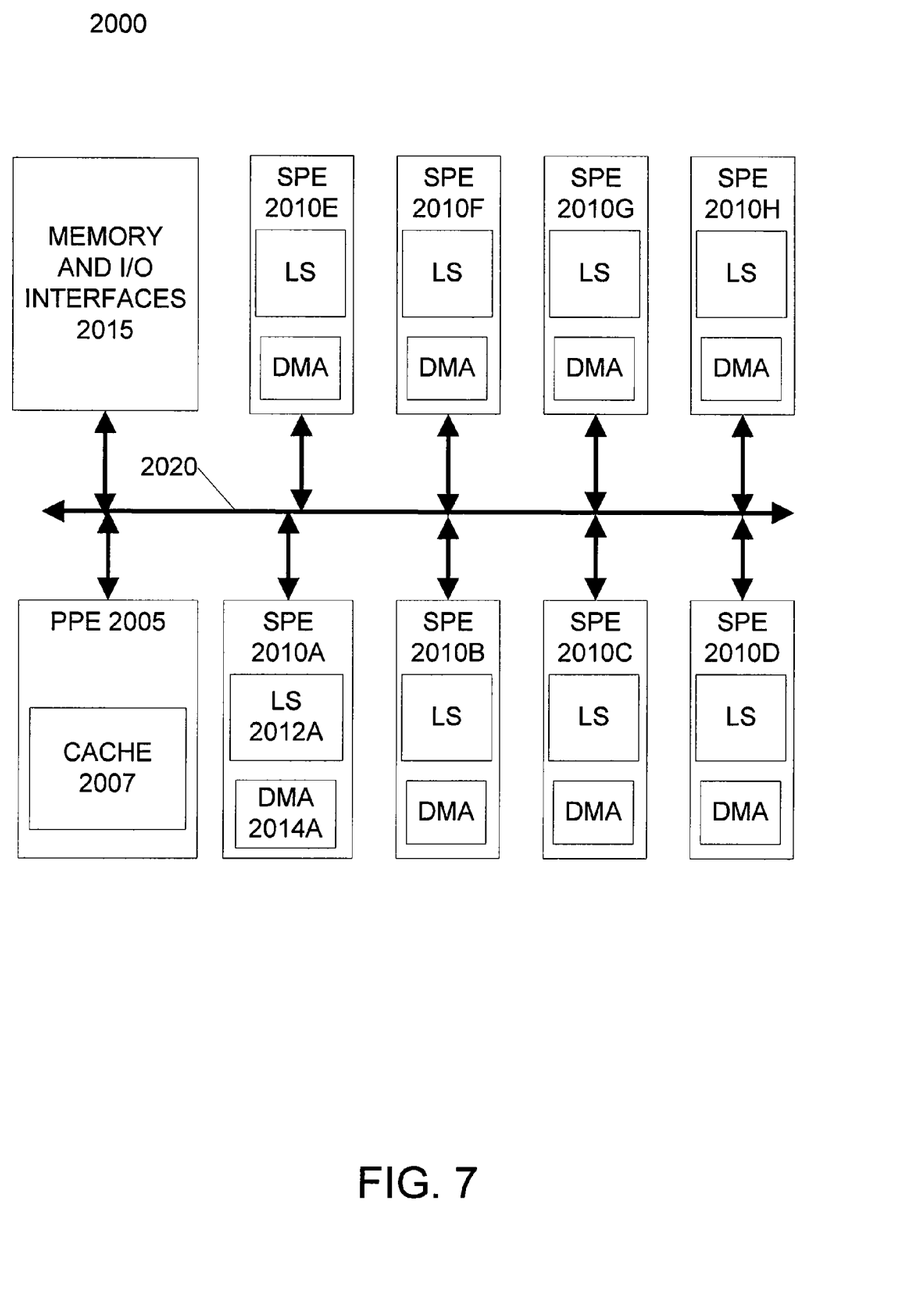
FIG. 7 illustrates an example processor suitable for use in implementing an embodiment of the invention.

In embodiments of the invention, CPU 1005 is one or more general-purpose microprocessors having one or more processing cores. Further embodiments of the invention can be implemented using one or more CPUs with microprocessor architectures specifically adapted for highly parallel and computationally intensive applications, such as media and interactive entertainment applications. FIG. 7 illustrates an example processor 2000 suitable for implementing an embodiment of the invention.

Processor 2000 includes a number of processor elements, each capable of executing independent programs in parallel. Processor 2000 includes SPE processor element 2005. PPE processor element is a general-purpose processor of CISC, RISC, or other type of microprocessor architecture known in the art. In one example, PPE processor element 2005 is a 64-bit, multithreaded RISC architecture microprocessor, such as the PowerPC architecture. PPE processor element 2005 can include a cache memory 2007 partitioned into one, two, or more levels of caches temporarily holding data and instructions to be executed by PPE processor element 2005.

For additional performance, processor 2000 includes a number of SPE processor elements 2010. In this example, processor 2000 includes eight SPE processor elements 2010A-2010H; however, other example processors can include different number of SPE processor elements. SPE processor elements 2010 are adapted for stream processing of data. In stream processing, a program is executed repeatedly on each item in a large set of data. To facilitate stream processing, the SPE processor elements 2010 may include instruction execution units capable of executing SIMD instructions on multiple data operands simultaneously. SPE processor elements 2010 may also include instruction units capable of executing single-instruction, single data (SISD) for more general processing tasks.

Each SPE processor element, such as SPE processor element 2010A, includes local data and instruction storage 2012A. Data and instructions can be transferred to and from the local data and instruction storage 2012A via DMA unit 2014A. The DMA units, such as unit 2014A, are capable of transferring data to and from each of the SPE processor elements 2010 without processor supervision, enabling the SPE processor elements 2010 to process data continuously without stalling.

Data and instructions are input and output by the processor 2000 via memory and I/O interfaces 2015. Data and instructions can be communicated between the memory and I/O interfaces 2015, the PPE processor element 2005, and SPE processor elements 2010 via processor bus 2020.

The above example computer system is discussed for the purposes of illustration and embodiments of the invention can be easily adapted to operate with any type of system including a camera and any type of display device capable of illuminating a nearby object. Further embodiments can be envisioned to one of ordinary skill in the art from the specification and figures. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of creating a computer graphics model of a physical object, the method comprising:
    displaying a first still illumination pattern on a display device so that the first illumination pattern illuminates a physical object;
    acquiring at least one still image of the physical object illuminated by the first illumination pattern, wherein the still image includes image points corresponding with points on the physical object and having shading values;
    determining if the still image of the physical object is suitable for creating a computer graphics model of the physical object;
    in response to a determination that the image of the physical object is not suitable, selecting a second illumination pattern and repeating the steps of displaying, acquiring, and determining if the image is suitable; and
    in response to a determination that the image is suitable, determining candidate surface orientations for each of a set of model points of a computer graphics model from the shading values, wherein the set of model points are each associated with at least a portion of the image points.

2. The method of claim 1, wherein the first illumination pattern includes a first value of an attribute, wherein the second illumination pattern is selected based on the first value of the attribute.

3. The method of claim 2, wherein selecting the second illumination pattern includes selecting the second illumination pattern from a set of illumination patterns for an illumination pattern based on the second illumination pattern including a second value of the attribute different than the first value.

4. The method of claim 2, wherein the attribute is a color comprising a substantial portion of the first illumination pattern.

5. The method of claim 1, wherein determining candidate surface orientations for each of the set of model points comprises:
identifying shading values of the portion of the image points associated with each model point; and
for each model point, associating a first set of candidate surface orientations corresponding with the identified shading values.

6. The method of claim 5, further comprising:
for each model point, determining an intersection of a second set of candidate surface orientations previously associated with the model point and the first set of candidate surface orientations; and
for each model point, associating the intersection of candidate surface orientations with the model point.

7. The method of claim 5, wherein associating the first set of candidate surface orientations corresponding with the identified shading values comprises:
deriving the first set of candidate surface orientations from the identified shading values and an illumination model.

8. The method of claim 5, wherein associating the first set of candidate surface orientations corresponding with the identified shading values comprises:
matching the shading values with calibration shading values derived from an image of a calibration object having a known geometry and illuminated by the first illumination pattern; and
defining the first set of candidate surface orientations from a portion of the known geometry of the calibration object corresponding with the calibration shading values.

9. The method of claim 1, further comprising:
determining if each of at least a substantial portion of the model points is associated with a single candidate surface orientation;
in response to the determination that that each of at least the substantial portion of the model points is associated with the single candidate surface orientation, defining a surface of the computer graphics model fitting the candidate surface orientations of the substantial portion of the model points.

10. The method of claim 1, further comprising:
identifying shading values of the portion of the image points associated with each model point; and
matching the shading values with calibration values derived from an image of a user's face in order to determine a direction of a light source.

11. The method of claim 1, further comprising:
identifying shading values of the portion of the image points associated with each model point; and
matching the shading values with calibration values derived from an image of a user's face in order to determine an orientation of a surface.

12. A system for creating a computer graphics model of a physical object, the system comprising:
a computer processor;
a memory operatively coupled to the processor, the processor and memory adapted to execute instructions to implement:
a first interface adapted to connect with a display device, wherein the first interface includes first interface logic adapted to produce a first set of still images to be output by the display device and provide incidental illumination of a physical object;
a second interface adapted to connect with a camera device, wherein the second interface includes second interface logic adapted to receive a second set of still images captured by the camera device, wherein the second set of still images include images of the physical object incidentally illuminated by the first set of still images;
first logic adapted to identify the images of the physical object in the second set of still images, wherein the first logic is adapted to further identify images in the second set of still images that poorly represent the physical object and to provide a feedback indicator to the first interface logic, wherein the first interface logic is further adapted to provide an alternate set of still images to the display device in response to the feedback indicator;
second logic adapted to define a computer graphics model including model points corresponding with the identified images of the physical object;
third logic adapted to determine candidate surface orientations for each of the model points of the computer graphics model from portions of the identified images of the physical object corresponding with each of the model points; and
fourth logic adapted to fit a surface to the model points consistent with the model points' candidate surface orientations in response to at least a substantial portion of the model points each having a single candidate surface orientation.

13. The system of claim 12, wherein the second interface is an internal interface and the system further includes the camera device.

14. The system of claim 12, wherein the second interface is an external interface.

15. The system of claim 12, wherein the first interface is an internal interface and the system further includes the display device.

16. The system of claim 12, wherein the first interface is an external interface.

17. The system of claim 12, wherein the images in the second set of images that poorly represent the physical object are associated with a first attribute value, and wherein the alternate set of images are associated with a second attribute value different from the first attribute value.

18. The system of claim 17, wherein the attribute is a color comprising a substantial portion of the images in the second set of images that poorly represent the physical object.

19. The system of claim 12, wherein the third logic is further adapted to derive the set of candidate surface orientations from the portions of the identified images of the physical object corresponding with each of the model points and an illumination model.

20. The system of claim 12, wherein the third logic is further adapted to match the portions of the identified images of the physical object corresponding with each of the model points with calibration shading values derived from images of a calibration object having a known geometry and illuminated by at least a portion of the first set of images; and to define the set of candidate surface orientations from portions of the known geometry of the calibration object corresponding with the calibration shading values.

21. The system of claim 20, wherein the calibration object is a portion of a user's face.

22. A non-transitory computer readable medium including instructions adapted to direct a computer to perform an operation, the operation comprising:
   displaying a first still illumination pattern on a display device so that the first illumination pattern illuminates a physical object;
   acquiring at least one still image of the physical object illuminated by the first illumination pattern, wherein the still image includes image points corresponding with points on the physical object and having shading values;
   determining if the still image of the physical object is suitable for creating a computer graphics model of the physical object;
   in response to a determination that the image of the physical object is not suitable, selecting a second illumination pattern and repeating the steps of displaying, acquiring, and determining if the image is suitable; and
   in response to a determination that the image is suitable, determining candidate surface orientations for each of a set of model points of a computer graphics model from the shading values, wherein the set of model points are each associated with at least a portion of the image points.

23. The computer readable medium of claim 22, wherein the first illumination pattern includes a first value of an attribute, wherein the second illumination pattern is selected based on the first value of the attribute.

24. The computer readable medium of claim 23, wherein selecting the second illumination pattern includes selecting the second illumination pattern from a set of illumination patterns for an illumination pattern based on the second illumination pattern including a second value of the attribute different than the first value.

25. The computer readable medium of claim 23, wherein the attribute is a color comprising a substantial portion of the first illumination pattern.

26. The computer readable medium of claim 22, wherein determining candidate surface orientations for each of the set of model points comprises:
   identifying shading values of the portion of the image points associated with each model point; and
   for each model point, associating a first set of candidate surface orientations corresponding with the identified shading values.

27. The computer readable medium of claim 26, further comprising:
   for each model point, determining an intersection of a second set of candidate surface orientations previously associated with the model point and the first set of candidate surface orientations; and
   for each model point, associating the intersection of candidate surface orientations with the model point.

28. The computer readable medium of claim 26, wherein associating the first set of candidate surface orientations corresponding with the identified shading values comprises:
   deriving the first set of candidate surface orientations from the identified shading values and an illumination model.

29. The computer readable medium of claim 26, wherein associating the first set of candidate surface orientations corresponding with the identified shading values comprises:
   matching the shading values with calibration shading values derived from an image of a calibration object having a known geometry and illuminated by the first illumination pattern; and
   defining the first set of candidate surface orientations from a portion of the known geometry of the calibration object corresponding with the calibration shading values.

30. The computer readable medium of claim 29, wherein the calibration object is a portion of a user's face.

31. The computer readable medium of claim 22, further comprising:
   determining if each of at least a substantial portion of the model points is associated with a single candidate surface orientation;
   in response to the determination that that each of at least the substantial portion of the model points is associated with the single candidate surface orientation, defining a surface of the computer graphics model fitting the candidate surface orientations of the substantial portion of the model points.

\* \* \* \* \*